3,440,269
PREPARATION OF XYLYLENE DIISOCYANATE FROM XYLYLENE DIHALIDES AND ALKALI CYANATES USING DIMETHYL SULFONE-ARYL HALIDE SOLVENT
Arnold L. McMaster, Lincoln Park, Mich., assignor to Wyandotte Chemicals Corporation, Wyandotte, Mich., a corporation of Michigan
No Drawing. Filed Dec. 27, 1965, Ser. No. 516,723
Int. Cl. C07c 119/04
U.S. Cl. 260—453                    8 Claims

ABSTRACT OF THE DISCLOSURE

A process for preparing xylylene diisocyanate which comprises reacting xylylene dichloride or xylylene dibromide with sodium cyanate or potassium cyanate in the presence of a solvent consisting essentially of a mixture of dimethyl sulfone and an aryl halide and recovering xylylene diisocyanate from the reaction mixture.

---

It is known in the prior art that xylylene diisocyanate can be prepared by reacting xylylene dihalides with alkali metal cyanates using dimethyl sulfone as a reaction medium. However, such prior art process possesses certain inherent disadvantages since the alkali metal cyanates are particularly effective catalysts for the rapid polymerization of the xylylene diisocyanate and intermediate reaction products. The rate of reaction of xylylene dihalides with alkali metal cyanates in a dimethyl sulfone reaction medium is substantially slower than the rate of polymerization of the isocyanate products. Thus, this reaction produces essentially polymeric xylylene diisocyanate.

Accordingly, it is a purpose of this invention to provide a novel process for the production of xylylene diisocyanate from xylylene halides wherein a high yield of xylylene diisocyanate monomer is obtained.

The above and other purposes of this invention are accomplished by providing a process for the preparation of xylylene diisocyanate which comprises reacting xylylene halide selected from the group consisting of xylylene dichloride and xylylene dibromide with a cyanate of a metal selected from the group consisting of sodium and potassium in the presence of a solvent consisting essentially of a mixture of dimethyl sulfone and an aryl halide containing at least one halogen atom bonded to an aryl carbon atom, and recovering the xylylene diiscoyanate from the reaction mixture. The preferred aryl halide compounds are monochlorobenzene and dichlorobenzene.

The success of the process of this invention is attributed to the action of the mixture of the aryl halide compound, as above described, with the dimethyl sulfone which overcomes the exothermic and uncontrollable nature of the reaction between the xylylene halide and the alkali metal cyanate.

It is preferred to carry out this reaction at a temperature of about 110 to 225° C. It has been found that the temperature may be best controlled by refluxing the inert solvent in conventional refluxing apparatus. The proportion of reactants can be varied over a wide range. That is, both the reactants can be used in stoichiometrically equivalent amounts or either can be used in large excess. A slight excess of alkali metal cyanate above the stoichiometric proportions is the most desirable for performing the process of this invention.

In a preferred embodiment of this invention, the weight ratio of dimethyl sulfone to the aryl halide in the solvent mixture is about 0.5/1 to 10.0/1. The proportion of this solvent mixture employed may vary over a wide range. However, the preferred weight ratio of dimethyl sulfone-aryl halide solvent mixture to the xylylene halide is from about 2.0/1 to 12.0/1.

If desired, the reaction can be enhanced by incorporation of catalysts, such as sodium iodide, in the reaction mixture.

The process of this invention may be performed both as a batch process and as a continuous process.

The following examples further illustrate the invention.

Example I 860 grams of ortho-dichlorobenzene, 350 grams of sodium cyanate, 7.0 grams of sodium iodide catalyst, and 200 milliliters of toluene are placed in a two-liter, three-necked reaction flask and heated to 110° C. with stirring. 350 grams of dimethyl sulfone are then added to the flask and the mixture heated to distill off the toluene, dehydrating the system. 260 grams of the ortho-dichlorobenzene is distilled off with the toluene.

105 grams of 95 percent meta-para-xylylene dichloride is then added with the temperature maintained at 185° C. with refluxing for 12 minutes. The total reaction time is 18.5 minutes. At the end of the reaction, the mixture is filtered to remove the excess sodium cyanate and sodium chloride, then cooled to room temperature and filtered to remove the dimethyl sulfone. The ortho-dichlorobenzene is stripped from the filtrate and the residue distilled. The yield based on xylylene dichloride consumed is 70 percent meta-para-xylylene diisocyanate monomer.

Example II 100 grams of dimethyl sulfone, 120 milliliters of ortho-dichlorobenzene, 50 grams of sodium cyanate, 1.0 gram of sodium iodide catalyst, and 20 milliliters of toluene are placed in a 500-milliliter, three-necked flask fitted with a stirrer and a short Vigreaux column. The mixture is slowly brought to a boil and 20 milliliters of distillate slowly taken off, thus dehydrating the system. At this time the reflux temperature of the mixture is 186 to 188° C. 14.5 grams of pure meta-xylylene dichloride are then added, the temperature being maintained at 189° C. with refluxing using the Vigreaux column. The total reaction time is 15 minutes. At the end of the reaction, the mixture is filtered to remove the excess sodium cyanate and sodium chloride, then cooled to room temperature and filtered to remove the dimethyl sulfone. The ortho-dichlorobenzene is stripped from the filtrate and the residue distilled. The yield based on xylylene dichloride consumed is 85 percent meta-xylylene diisocyanate monomer.

Example III 100 grams of dimethyl sulfone, 120 milliliters of ortho-dichlorobenzene, 50 grams of sodium cyanate, 1.0 gram of sodium iodide, and 20 milliliters of toluene are placed in a 500-milliliter, three-necked flask fitted with a stirrer and a short Vigreaux column. The mixture is slowly brought to a boil and 20 milliliters of distillate slowly taken off, thus dehydrating the system. At this time the reflux temperature of the mixture is 188° C. 22 grams of pure meta-xylylene dibromide are then added, the temperature being maintained at 190° C. with refluxing using the Vigreaux column. The total reaction time is 15 minutes. At the end of the reaction, the mixture is filtered to remove the excess sodium cyanate and sodium chloride, then cooled to room temperature and filtered to remove the dimethyl sulfone. The ortho-dichlorobenzene is stripped from the filtrate and the residue distilled. The yield based on xylylene dibromide consumed is in excess of 70 percent meta-xylylene diisocyanate monomer.

Example IV 100 grams of dimethyl sulfone, 120 milliliters of ortho-dichlorobenzene, 60 grams of potassium cyanate, 1.0 gram of sodium iodide, and 20 milliliters of toluene are placed in a 500-milliliter, three-necked flask fitted with a stirrer and a short Vigreaux column. The mixture is slowly brought to a boil and 20 milliliters of distillate slowly taken off, thus dehydrating the system. At this time the reflux temperature of the mixture is 186° C. 14.5 grams of pure meta-xylylene dichloride are then added, the temperature being maintained at 190° C. with refluxing using the Vigreaux column. The total reaction time is 15 minutes. At the end of the reaction, the mixture is filtered to remove the excess potassium cyanate and potassium chloride, then cooled to room temperature and filtered to remove the dimethyl sulfone. The ortho-dichlorobenzene is stripped from the filtrate and the residue distilled. The yield based on xylylene dichloride consumed is in excess of 70 percent meta-xylylene disocyanate monomer.

Example V 100 grams of dimethyl sulfone, 120 milliliters of monochlorobenzene, 50 grams of sodium cyanate, 1.0 gram of sodium iodide, and 20 milliliters of toluene are placed in a 500-milliliter, three-necked flask fitted with a stirrer and a short Vigreaux column. The mixture is slowly brought to a boil and 20 milliliters of distillate slowly taken off, thus dehydrating the system. 14.5 grams of pure meta-xylylene dichloride are then added, the temperature being maintained at 130° C. with refluxing using the Vigreaux column. The total reaction time is 15 minutes. At the end of the reaction, the mixture is filtered to remove the excess sodium cyanate and sodium chloride, then cooled to room temperature and filtered to remove the dimethyl sulfone. The monochlorobenzene is stripped from the filtrate and the residue distilled. The yield based on xylylene dichloride consumed is in excess of 70 percent meta-para-xylylene diisocyanate monomer.

Example VI 100 grams of dimethyl sulfone, 120 milliliters of ortho-dichlorobenzene, 50 grams of sodium cyanate, 1.0 gram of sodium iodide, and 20 milliliters of toluene are placed in a 500-milliliter, three-necked flask fitted with a stirrer and a short Vigreaux column. The mixture is slowly brought to a boil and 20 milliliters of distillate slowly taken off, thus dehydrating the system. At this time the reflux temperature of the mixture is 186 to 188° C. 14.5 grams of pure para-xylylene dichloride are then added, the temperature being maintained at 190° C. with refluxing using the Vigreaux column. The total reaction time is 15 minutes. At the end of the reaction, the mixture is filtered to remove the excess sodium cyanate and sodium chloride, then cooled to room temperature and filtered to remove the dimethyl sulfone. The ortho-dichlorobenzene is stripped from the filtrate and the residue distilled. The yield based on xylylene dichloride consumed is in excess of 70 percent para-xylylene diisocyanate monomer.

What is claimed is:

1. A process for preparing xylylene diisocyanate which comprises reacting at a temperature from about 110° C. to 225° C. a xylylene halide selected from the group consisting of xylylene dichloride and xylylene dibromide with a cyanate of metal selected from a group consisting of sodium and potassium in the presence of a solvent consisting essentially of a mixture of dimethyl sulfone and an aryl halide selected from the group consisting of dichlorobenzene and monochlorobenzene wherein the weight ratio of dimethyl sulfone to said aryl halide in said solvent mixture is about 0.5/1 to 10.0/1 and recovering xylylene diisocyanate from the reaction mixture.

2. A process as defined in claim 1 wherein said xylylene halide is xylylene dichloride.

3. A process as defined in claim 1 wherein said xylylene halide is xylylene dibromide.

4. A process as defined in claim 1 wherein said cyanate is sodium cyanate.

5. A process as defined in claim 1 wherein said cyanate is potassium cyanate.

6. A process as defined in claim 1 wherein the weight ratio of said dimethyl sulfone-aryl halide solvent mixture to said xylylene halide is about 2.0/1 to 12.0/1.

7. A process in accordance with claim 6 wherein said aryl halide is dichlorobenzene and said alkali metal cyanate is sodium cyanate.

8. A process in accordance with claim 7 wherein the temperature is controlled by carrying out the reaction under refluxing conditions.

References Cited

UNITED STATES PATENTS 2,884,360  4/1959  Bloom et al. _____ 260—453 X
3,017,420  1/1962  Schaeffer _____ 260—453

OTHER REFERENCES

Arnold et al.: Chemistry of Organic Isocyanates, 1956, pp. 3–4.

CHARLES B. PARKER, *Primary Examiner.*

S. T. LAWRENCE III, *Assistant Examiner.*

U.S. Cl. X.R.

149—19, 22, 89, 109